(12) United States Patent
Deker

(10) Patent No.: US 6,269,301 B1
(45) Date of Patent: Jul. 31, 2001

(54) METHOD FOR CONTROLLING A VEHICLE IN ORDER TO CHANGE COURSE AND APPLICATION OF METHOD FOR THE LATERAL AVOIDANCE OF A ZONE

(75) Inventor: Guy Deker, Chaville (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/147,335
(22) PCT Filed: Jun. 3, 1997
(86) PCT No.: PCT/FR97/00970
§ 371 Date: Feb. 24, 1999
§ 102(e) Date: Feb. 24, 1999
(87) PCT Pub. No.: WO97/47946
PCT Pub. Date: Dec. 18, 1997

(30) Foreign Application Priority Data

Jun. 7, 1996 (FR) .................................................. 96 07076

(51) Int. Cl.[7] .................................................. G06F 17/00
(52) U.S. Cl. ........................................... 701/206; 701/210
(58) Field of Search ............................. 701/3, 1, 23, 14, 701/200, 202, 206, 207, 208–210, 300, 302

(56) References Cited

U.S. PATENT DOCUMENTS

| 4,812,990 | * | 3/1989 | Adams et al. ............................ 701/3 |
| 5,058,024 | * | 10/1991 | Inselberg .............................. 701/301 |
| 5,445,021 | * | 8/1995 | Cattoen et al. ...................... 73/178 R |
| 5,706,011 | * | 1/1998 | Huss et al. ............................. 342/65 |
| 5,774,818 | * | 6/1998 | Pages ...................................... 701/3 |
| 5,850,617 | * | 12/1998 | Libby .................................... 701/212 |

* cited by examiner

Primary Examiner—William A. Cuchlinski, Jr.
Assistant Examiner—Edward Pipala
(74) Attorney, Agent, or Firm—Oblon, Spivak, McClelland, Maier & Neustadt, P.C.

(57) ABSTRACT

Method for piloting a vehicle while making a change of heading. The vehicle follows a first rectilinear portion of a route, so as to meet up with a second rectilinear portion of the route forming a predetermined angle with the first portion. The route passes through the meeting point of the two portions. The vehicle computes and follows a curved change of heading trajectory which passes through the meeting point whose turning center lies on the interior bisector of the angle formed by the two portions of the route.

20 Claims, 3 Drawing Sheets

METHOD FOR CONTROLLING A VEHICLE IN ORDER TO CHANGE COURSE AND APPLICATION OF METHOD FOR THE LATERAL AVOIDANCE OF A ZONE

BACKGROUND OF THE INVENTION

1. Field of the Invention

The present invention relates to a method for piloting a vehicle following a trajectory comprising two non-aligned segments of route defining a change of heading, with compulsory overflying of the point common to the two segments.

2. Discussion of the Background

It applies in particular, but not exclusively, to the piloting of an aerodyne which follows a route which is generally defined by a set of transit points connected by rectilinear segments of trajectory, these transit points or "waypoints" indicating changes of heading.

These heading changes generally have to be made with a predetermined turning radius, for example one which varies as a function of the speed of the aerodyne in such a way as to maintain a constant angle of roll. To comply with a predetermined turning radius, it is therefore necessary to commence the turn either before the transit point, in which case the aerodyne will lie inside the planned turn, or at the moment at which the transit point is overflown, in which case the aerodyne will, after overflying the transit point, lie outside the planned turn and will then have to follow a trajectory intended to meet up with the initially planned route.

In the second case, it transpires, as represented in FIG. 4, that during its change of heading $\Delta\psi$, at the moment at which the transit point is overflown, the aerodyne strays significantly from the planned route R1, R2, and is even a relatively large distance d from it, which on the one hand causes a relatively large lengthening of the trajectory and on the other hand is undesirable in relation to surveillance and air control (compliance with variable lateral width margins).

SUMMARY OF THE INVENTION

The objective of the present invention is to eliminate these drawbacks. For this purpose, it proposes a method for piloting a vehicle with a view to making a change of heading, the vehicle following a first rectilinear portion of route, so as to meet up with a second rectilinear portion of route forming a predetermined angle with the first portion of route, by passing through the meeting point of the two portions of route.

According to the invention, this method is characterized in that it comprises the computation and following by the vehicle of a curved change of heading trajectory passing through the said meeting point, whose turning centre lies on the interior bisector of the angle formed by the two portions of route.

Such a change of heading trajectory offers numerous advantages by comparison with the trajectory of the prior art illustrated by FIG. 4. This is because it makes it possible to save several seconds (up to 35 seconds or 4.5 nautical miles for a 90-degree turn). It deviates less from the planned route defined by the rectilinear sections of route (less than 30% of the deviation incurred by the conventional transition trajectory), this being of considerable benefit in respect of surveillance and air control. It also carries less risk of culminating in a linked succession of turns which criss-cross if the segments of route are short.

Moreover, if this change of heading trajectory is compared with the conventional trajectory which consists of a tangent curve to the two portions of route, which is situated inside the turn, it is observed that the trajectory according to the invention deviates less from the portions of route than the conventional trajectory.

Advantageously, the method according to the invention comprises the computation and following of two portions of curved linking trajectory, respectively between the first portion of route and the change of heading trajectory, and between the latter and the second portion of route, these two portions of linking trajectory having the same turning radius as that of the change of heading trajectory, and being tangent to the latter and to the two portions of route respectively.

The invention also relates to a method for avoiding a stationary polygonal zone applying the change of heading method to each corner of the polygonal zone.

This is because, in certain cases, it proves to be necessary to bypass a zone which it is prohibited to enter. Such cases arise in particular when there is a prohibition to overfly a zone of air space, such as a military zone or a state.

The avoidance method is aimed at determining the new route to be followed, by reducing as far as possible the distance to be travelled. For this purpose, it comprises the following steps:

- the modelling of the contour of the zone to be avoided by a convex polygonal shape, by approximating the contour of the zone by a succession of segments, and eliminating the points of concavity and the excessively short segments,
- the locating of the planned route with respect to the modelled zone,
- the computation of port and starboard sections of route for exit and for return to the planned route, forming a predetermined angle with the latter and meeting up with the corner point of the polygonal shape which is closest to the planned route, so as to obtain two avoidance routes, port and starboard, formed by the exit and return sections of route and by the portions of the modelled contour respectively connecting the port and starboard exit and return transition sections of route, and
- the selection of one of the two avoidance routes, port or starboard.

By virtue of these provisions, the trajectory followed passes as closely as possible to the boundaries of the zone without ever entering it.

BRIEF DESCRIPTION OF THE DRAWINGS

An embodiment of the method according to the invention will be described below, by way of non-limiting example with reference to the appended drawings in which.

DETAILED DESCRIPTION OF THE PREFERRED EMBODIMENTS

Figure 1:
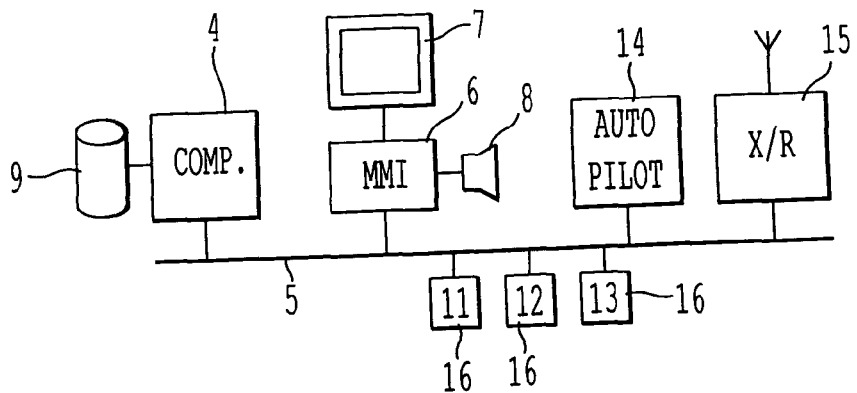
FIG. 1 diagrammatically represents the electronic equipment carried on board an aerodyne making it possible to implement the avoidance method according to the invention.

As represented in FIG. 1, the avoidance method according to the invention is particularly designed to be executed by a computer 4 installed on board an aerodyne, which is coupled by way of a data transmission bus 5, called the "aircraft bus", to the navigation equipment which includes an automatic piloting device 14 and navigation instruments 16, to a data transmission device 15, for example a data-link, and also to a man/machine interface device (MMI) 6 comprising a control element and signalling elements, such as a display screen 7 and a loudspeaker 8 which are installed in the cockpit.

In a known manner, the automatic piloting device 14 comprises a memory in which is recorded the aerodyne's planned trajectory consisting of a succession of straight segments between the departure point and the destination point, and of transition trajectories making it possible to connect one segment to another.

The data transmission device 15 is able to receive information indicating that it is momentarily prohibited to overfly an air zone indicated for example by its name. Moreover, the computer 4 is for example coupled to a geographical navigational database 9 wherein are stored in particular the contours of the air zones of the territory normally overflown by the aerodyne. It is also possible for the pilot of the aerodyne himself to input the contours of the prohibited zone by means of the man/machine interface 6.

Figure 2:
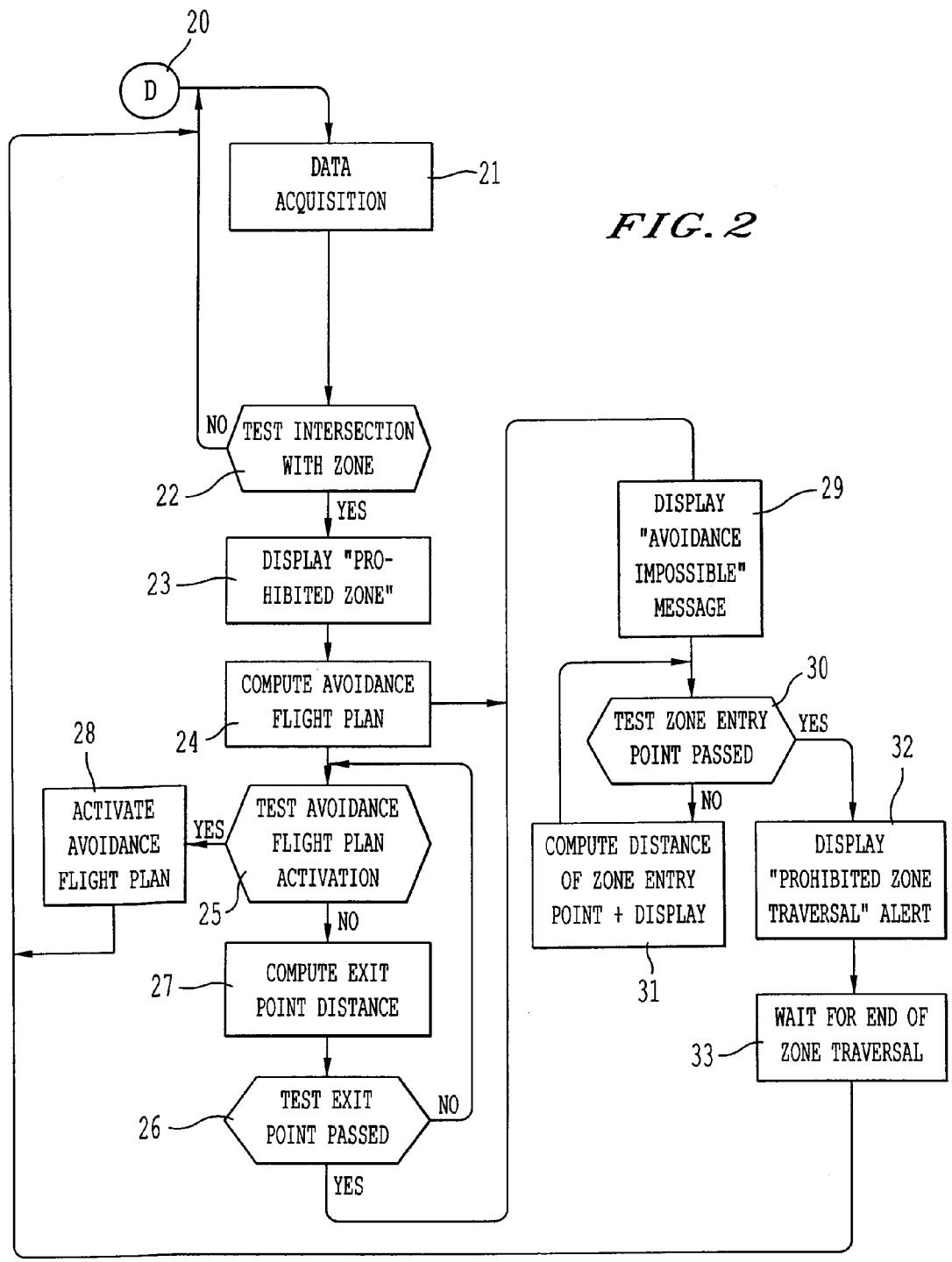
FIG. 2 diagrammatically shows the algorithm executed to implement the avoidance method.

The algorithm shown in FIG. 2 is executed by the computer 4 installed on board the aerodyne. It consists firstly in acquiring the data supplied by the data transmission device 15 and by the pilot by way of the man/machine interface device 6 (step 21).

When information relating to the prohibition to traverse an air zone is received, the computer 4 locates the route defined by the planned flight plan, with respect to the prohibited zone. To do this, when the information received is not supplemented by a definition of the contour of the zone, the computer 4 will search for this information in its database 9 and access the definition of the planned flight plan, which is for example stored in the automatic piloting device 14 (step 22).

Figure 3:
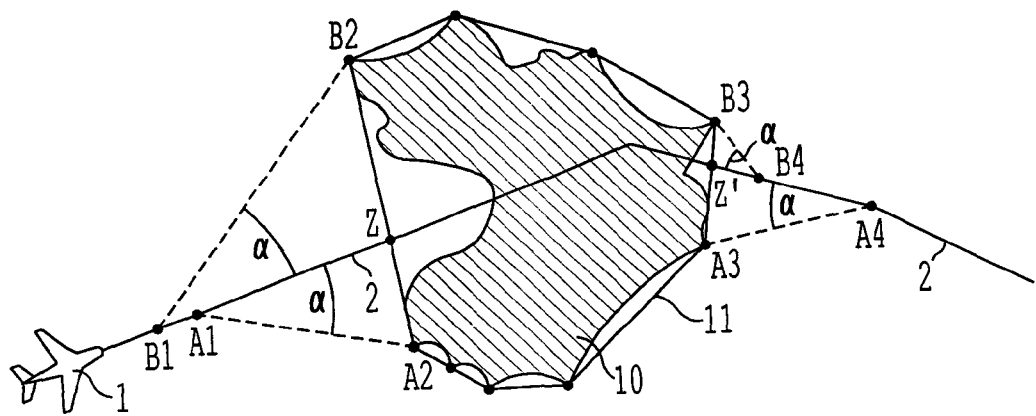
FIG. 3 shows a prohibited zone situated on the route of an aerodyne so as to illustrate the avoidance method.

If the aerodyne is not going to enter the prohibited zone, the analysis of the information supplied by the data transmission device 15 and by the MMI 6 is continued by returning to the start 20 of the algorithm. In the contrary case, in step 23 the computer 4 sends a message intended for the display 7 so as to warn the pilot that the route 2 to be travelled by the aerodyne 1 traverses a prohibited zone 10 (FIG. 3). This information can be supplemented by the displaying on the screen 7 of the map of the overflown region, overlaid with an indication of the prohibited zone and possibly of its characteristics.

The computer next triggers the computation of an avoidance trajectory (step 24) which consists firstly in modelling the contours of the prohibited zone 10. This modelling consists in likening the contour of the zone 10 to a polygon, and in then eliminating the concave corners of the polygon and the excessively short sides, so as to obtain an entirely convex polygon 11.

Next it is necessary to determine the port B1–B2 and starboard A1–A2 portions of route for exiting the planned route so as to avoid the prohibited zone 10. For this purpose, the computer 4 positions the planned route 2 with respect to the modelled contours of the zone 10. These portions of route deviate from the planned route 2 by a predetermined angle α of 45 degrees or 30 degrees depending on the air regulations in force in the region overflown, and meet up respectively with the points B2, A2 of the polygon 11 which are closest to the planned route 2 on either side of the point of entry Z of the planned route 2 into the polygon 11.

However, it may prove to be impossible to determine the exit portions of route, when the aerodyne 1 lies too close to the prohibited zone 10. This situation occurs when the angle of exit from the initial route which makes it possible to avoid the zone is greater than a predetermined angle α. When this case occurs, the computer 4 executes the algorithm starting from step 29 whereat is triggered the displaying of a message "automatic avoidance impossible".

In the contrary case, the computer 4 next determines the port B3–B4 and starboard A3–A4 portions of route for returning to the planned route 2. These portions of route meet up with the planned route at an angle α and are connected to the polygon 11 respectively at the points B3, A3 closest to the planned route 2, on either side of the point of exit Z' of the planned route 2 from the polygon 11.

To fully determine the starboard A1–A4 and port B1–B4 routes for avoiding the prohibited zone 10, it is next sufficient to connect the starboard A1–A2 and port B1–B2 exit portions of route respectively to the starboard A3–A4 and port B3–B4 return portions of route via the portions of contour A2–A3, B2–B3 of the polygon 11 connecting the points A2 and A3, and B2 and B3 respectively.

Since the starboard A1 and port B1 route exit points can be different, as can the starboard A4 and port B4 points of return to the planned route, it is important to reconstruct avoidance routes having the same end points. Thus, if A1 is nearer to the zone than B1, as in FIG. 3, the segment B1–A1 is added to the starboard trajectory A1–A2–A3–A4. Likewise, if the point of return B4 is closer to the zone than A4, the segment B4–A4 is added to the port trajectory B1–B2–B3–B4.

Next it is necessary to choose one of the two avoidance routes, starboard A1–A4 and port B1–B4, thus determined. To do this, the computer 4 computes the length of each of the two new routes B1–A1–A2–A3–A4, B1–B2–B3–B4–A4 so as to select the shorter, and if these two new routes are of equal length, that which lies windward of the zone 10 is chosen.

The avoidance route selected makes it possible to modify the initial flight plan supplied by the automatic piloting device 14, which can be displayed on the screen 7, with request for confirmation by the pilot.

In step 25, the computer 4 waits for the confirmation by the pilot of the new flight plan including the avoidance route A1–A4 selected, doing so until the point of exit A1 from the initially planned route 2 has been passed (step 26). While waiting, the computer 4 computes and displays the value of the distance of this point of exit A1, having regard to the current position of the aerodyne 1, this value being periodically refreshed (step 27).

If, during this wait, the pilot has confirmed the new flight plan, the latter is sent to the automatic piloting device 14 in replacement for that 2 initially planned, which then becomes active (step 28). This new flight plan allows the automatic avoidance of the zone if the flight plan management and lateral-mode automatic piloting systems are functioning.

If the pilot has not confirmed the new flight plan before crossing the point of exit A1, in step 29 the computer 4 sends a message to the pilot to indicate that this point of exit has been passed and that avoidance of the zone is now impossible. Next, in step 30, it computes the distance between the current position of the aerodyne 1 and the entry point Z into the prohibited zone delimited by the polygon 12. So long as the aerodyne 1 has not reached the point Z, this distance is displayed with periodic refreshing (step 31). After this point Z has been crossed, the computer 4 sends an alert message which signals to the pilot that the aerodyne 1 is in a prohibited zone (step 32). The computer 4 then waits for the prohibited zone 10 to be exited, having regard to the position of the point of exit Z' from this zone, and also to the current position and to the speed of the aerodyne 1 (step 33), before returning to step 18 for acquiring data, with erasure of the alert message.

Before sending the new flight plan to the automatic piloting device, but after confirmation by the pilot, in step 28 the computer 4 computes the trajectory making it possible to follow this new flight plan, and in particular, the transition trajectories making it possible to pass from one section of route of the flight plan to another.

The transition at the change of heading points such as A1 and A4, off the contours of the polygonal zone 11, is carried out in the conventional manner from inside the turn, by determining a circle of predetermined radius tangential to the two sections of route to be connected.

When these are change of heading points belonging to the contour of the convex polygonal zone 11, it is not possible to make the change of heading from inside the turn, since this entails entering the prohibited zone 10. Hence, the computer 4 will, according to the invention, calculate a trajectory passing outside the turn and through the turn point.

Figure 5:
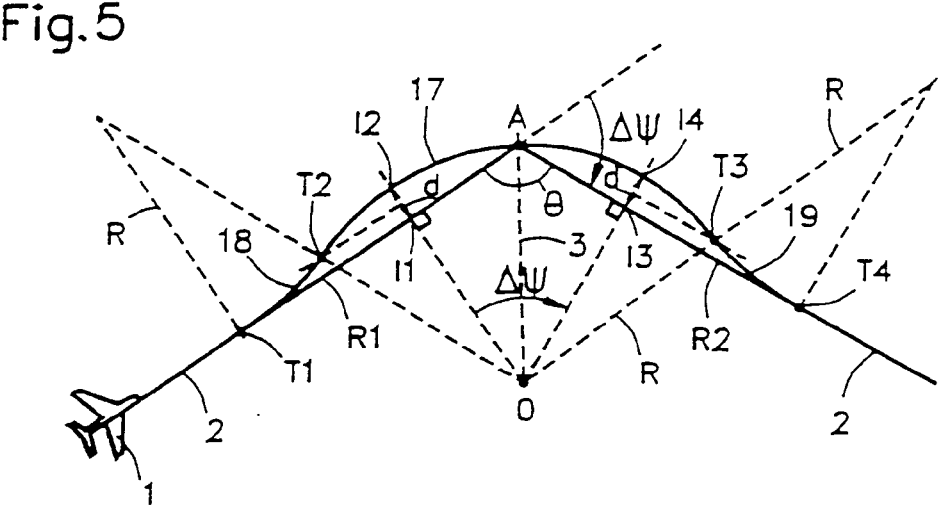
FIG. 5 shows the change of heading trajectory calculated by the piloting method according to the invention.

As represented in FIG. 5 showing two sections of route connected to a point A, forming an angle θ, and entailing a change of heading by an angle αψ, the computer 4 computes a curved trajectory 17 passing through the point A, whose turning centre O is situated on the interior bisector 3 of the angle θ and a distance R from the point A. This distance R corresponds to the turning radius of the curved trajectory 17, which is determined as a function of the speed of the aerodyne 1 which must make the turn with a predetermined angle of roll.

It is next necessary to determine the portions of linking trajectory 18, 19 between the rectilinear trajectories along the sections of route R1, R2, and the curved trajectory 17. The linking trajectory 18 which makes it possible to connect the section R1 with the curved trajectory 17 consists of a portion of curved trajectory with the same turning radius R, and is tangential at T1 to the section of route R1 and at T2 to the curved trajectory 17. Likewise, the linking trajectory 19 is a portion of curved trajectory with turning radius R, which is tangential at T3 to the curved trajectory 17 and at T4 to the section of route R2.

It should be noted that the points T2 and T3 correspond to the point of intersection of the curved trajectory 17 and the mid-perpendiculars of the segments d respectively delimited by the points of intersection I1, I2, I3, I4 of straight lines perpendicular to the sections of route R1, R2, passing through the turning centre 0, with the sections of route R1, R2 and the curved trajectory 17.

Figure 6:
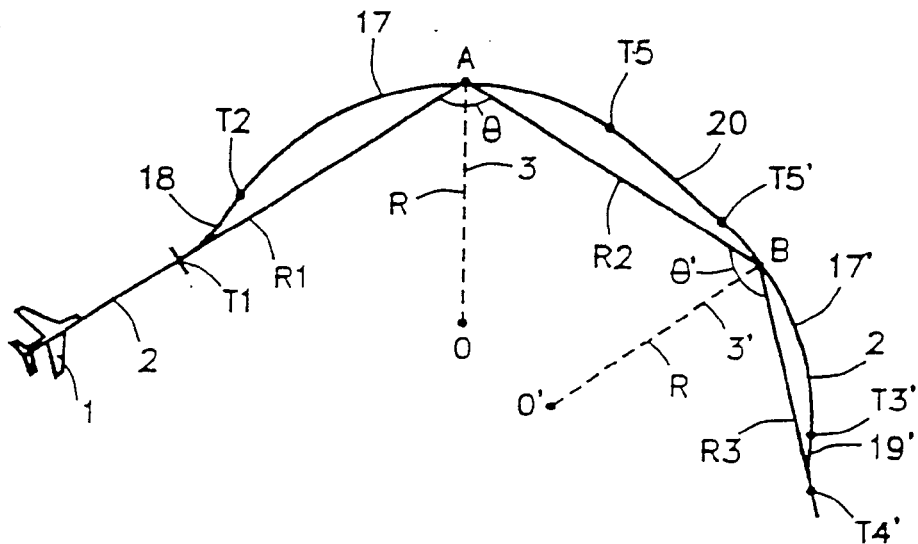
FIG. 6 shows the optimized transition trajectory in the case of two close changes of heading.

It may also be observed in FIG. 6 that the method according to the invention is perfectly suitable when there are two closely-spaced change of heading points A, B. This figure shows three sections of route R1, R2, R3 connected by the points A and B, and forming angles θ and θ' at A and B. As before, to make these two changes of heading, two curved trajectories 17, 17' are computed which pass respectively through A and B, and have a turning centre O, O' and a turning radius R, these two curved trajectories meeting up respectively with the sections of route R1 and R3 at the points T1 and T4' via two linking trajectories 18, 19'.

In the example of FIG. 6, it is not possible to connect the curved trajectories 17, 17' to the section of route R2, the latter being too short. In this case, it is sufficient to connect the two trajectories 17, 17' by a linking trajectory 20 which is tangential to them at the points T5 and T5'.

Figure 4:
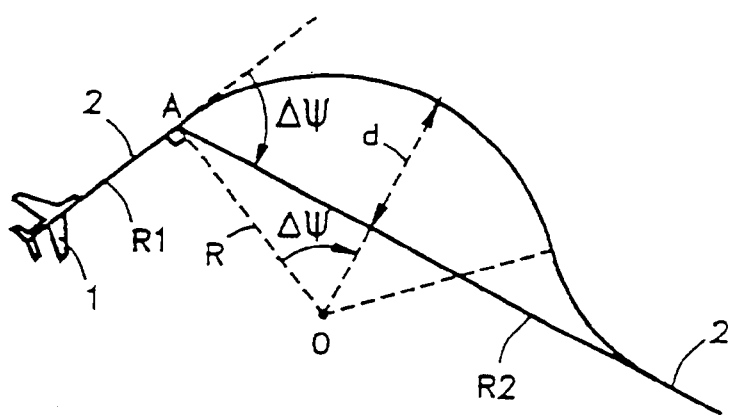
FIG. 4 diagrammatically represents the transition trajectory between two sections of route according to the prior art.

If the trajectory of FIG. 4 is compared with those illustrated by FIGS. 5 and 6, these latter deviate much less from the planned route R1–R2 and meet up with it much more rapidly, thus allowing more efficient surveillance and air control.

Thus, the deviation in the case of a bypass with conventional overflying of the point (FIG. 4) is equal to $R(1-\cos\Delta\psi)$. In the solution proposed by the invention, this deviation is now only $R(1-\cos\Delta\psi/2)$, i.e. around three times smaller at $\Delta\psi=90$ degrees.

Moreover, in the case of a short section of route R2, according to FIG. 6, we remain close to the planned route. By contrast, in the case of FIG. 4 it is clearly apparent that it will be difficult to meet up with the following section of route R3.

What is claimed is:

1. Method for piloting a vehicle with a view to making a change of heading, the vehicle following a first rectilinear portion of a route, so as to meet up with a second rectilinear portion of the route forming a predetermined angle with the first portion of route, by passing through the meeting point of the two portions of the route, said method comprising:

computing a curved change of heading trajectory passing through said meeting point, wherein a center of said curved change turning lies on the interior bisector of the angle formed by the first and second rectilinear portions of the route; and causing said vehicle to follow the curved change of heading trajectory computed.

2. Method according to claim 1, further comprising computing and following a first curved linking trajectory between the first rectilinear portion of the route and the change of heading trajectory, and a second curved linking trajectory between the change of heading trajectory and the second rectilinear portion of the route, each linking trajectory having the same turning radius as that of the change of heading trajectory, and being tangent to the change of heading trajectory and to a respective rectilinear portion of the route.

3. Method according to claim 1, wherein, in the case of two closely-spaced changes of heading, the method further comprises the computation and following of a second curved change of heading trajectory connected to the first change of heading trajectory by a rectilinear linking trajectory tangent to the two curved change of heading trajectories.

4. Method according to claim 1, wherein a turning radius is computed as a function of the speed of the vehicle in such a way as to comply with a predetermined angle of roll of the vehicle.

5. Method for the lateral avoidance by a vehicle of a prohibited zone by following an avoidance route comprising a succession of changes of heading, the said method applying the piloting method according to claim 1 to each point of change of heading of the route, and including a step of computing the avoidance route which comprises:

modelling a contour of the zone to be avoided by a convex polygonal shape, by approximating the contour of the zone by a succession of segments, and eliminating the points of concavity and the excessively short segments, locating a planned route with respect to the modelled zone, computing port and starboard routing sections for exit and for return to the planned route, forming a predetermined angle with the planned route and meeting up with a corner point of the polygonal contour, so as to obtain port and starboard avoidance routes formed by the exit and return routing sections and by the portions of the modelled contour respectively connecting the port and starboard exit and return routing sections, and selecting one of the port and starboard avoidance routes.

6. Method according to claim 5, wherein the port and starboard exit and return routing sections connect the planned route respectively to the corner points of the polygonal contour, which are situated on either side of the planned route, and which are closest to the points of intersection of the planned route and the polygonal contour.

7. Method according to claim 5, wherein the determining of the two avoidance routes includes determining the two avoidance routes to have common exit and return points and then determining which of the two avoidance routes is shorter and selecting the shorter avoidance route.

8. Method according to claims 5, further comprising:
searching for a section of the planned route traversing the prohibited zone, and computing a planned point of entry into said zone, the computation of the avoidance route being performed if the vehicle lies sufficiently far from the planned point of entry having regard to the speed of the vehicle.

9. Method according to claim 5, further comprising:
periodically computing and displaying the distance between a current position of the vehicle and the point of exit from the initial route to the selected avoidance route, and activating a new route including the selected avoidance route being performed if this new route has been confirmed.

10. Method according of claim 5, further comprising periodically computing and displaying a distance between a current position of the vehicle and the zone to be avoided if the exit point from the planned route to a selected avoidance route has been passed without the selected avoidance route having been confirmed and displaying an alert message if the vehicle actually enters the zone to be avoided.

11. Method according to claim 2, wherein, in the case of two closely-spaced changes of heading, the method further comprises the computation and following of a second curved change of heading trajectory connected to the first change of heading trajectory by a rectilinear linking trajectory tangent to the two curve change of heading trajectories.

12. Method according to claim 2, wherein a turning radius is computed as a function of the speed of the vehicle in such a way as to comply with a predetermined angle roll of the vehicle.

13. Method according to claim 3, wherein a turning radius is computed as a function of the speed of the vehicle in such a way as to comply with a predetermined angle of roll of the vehicle.

14. Method according to claim 6, wherein the determining of the two avoidance routes includes determining the two avoidance routes to have common exit and return points and then determining which of the two avoidance routes is shorter and selecting the shorter avoidance route.

15. Method according to claim 6, further comprising:
searching for a section of the planned route traversing the prohibited zone, and computing a planned point of entry into said prohibited zone, the computation of the avoidance route being performed if the vehicle lies sufficiently far from the planned point of entry having regard for the speed of the vehicle.

16. Method according to claim 7, further comprising:
searching for a section of the planned route traversing the prohibited zone, and computing a planned point of entry into said prohibited zone, the computation of the avoidance route being performed if the vehicle lies sufficiently far from the planned point of entry having regard for the speed of the vehicle.

17. Method according to claim 6, further comprising:
periodically computing and displaying the distance between a current position of the vehicle and the point of exit form the initial route to the selected avoidance route, and activating new route including the selected avoidance route being performed if this new route has been confirmed.

18. Method according to claim 7, further comprising:
periodically computing and displaying the distance between a current position of the vehicle and the point of exit form the initial route to the selected avoidance route, and activating new route including the selected avoidance route being performed if this new route has been confirmed.

19. Method according to claim 8, further comprising:
periodically computing and displaying the distance between a current position of the vehicle and the point of exit form the initial route to the selected avoidance route, and activating new route including the selected avoidance route being performed if this new route has been confirmed.

20. Method according to claim 6, further comprising periodically computing and displaying the distance between a current position of the vehicle and the zone to be avoided, and, if the point of exit has been passed without the new route having been confirmed, displaying an alert message when the vehicle enters the zone to be avoided.

* * * * *